March 15, 1955   J. F. BRUNDAGE   2,704,021
WHEELED IMPLEMENT FRAME
Filed Sept. 21, 1948   2 Sheets-Sheet 2
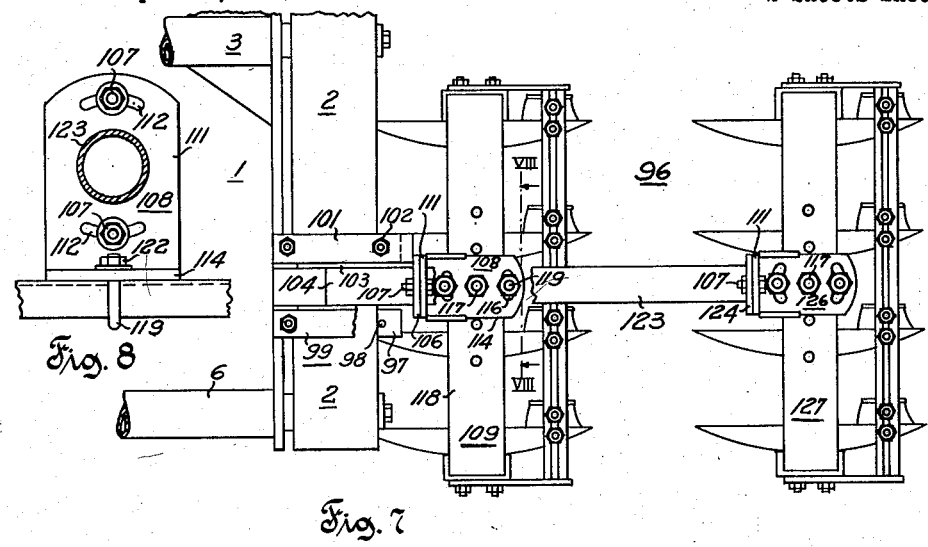
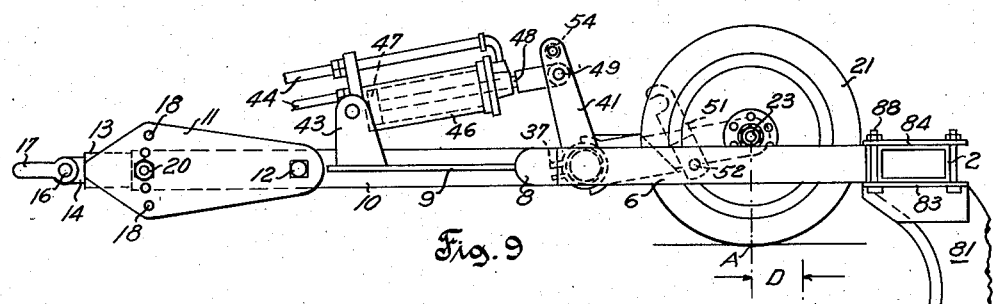
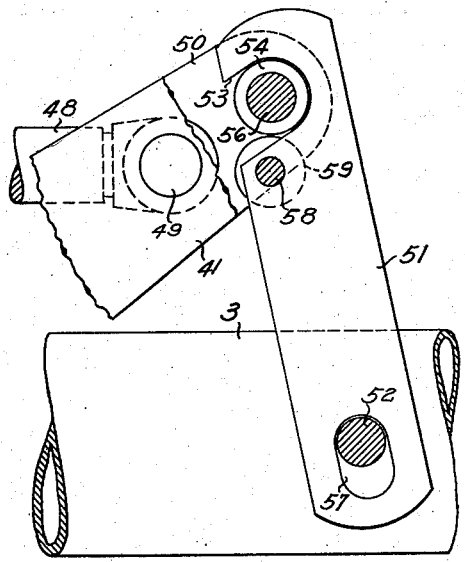
Inventor
John F. Brundage
by Kimball A. Wyman
Attorney

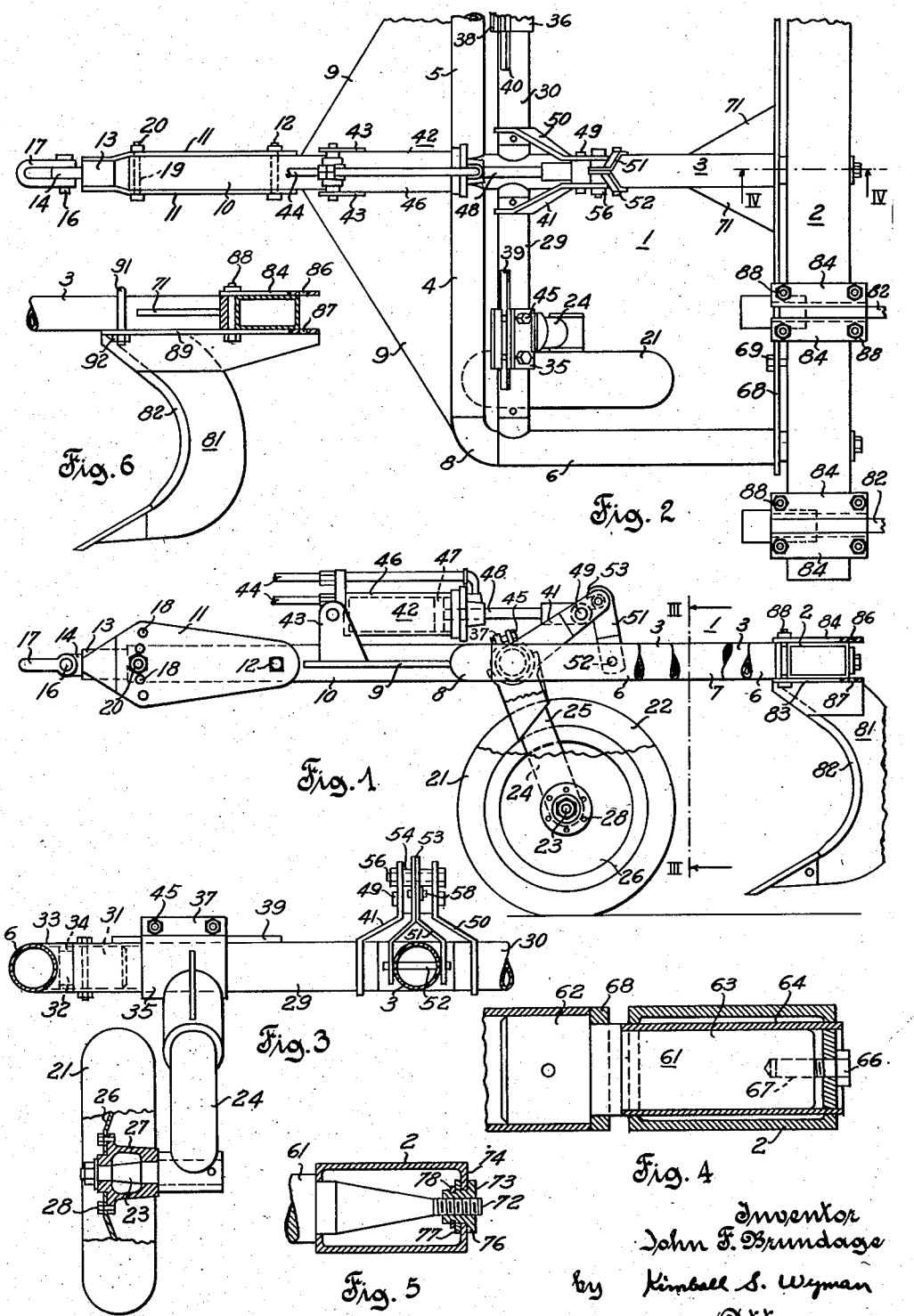

United States Patent Office 2,704,021
Patented Mar. 15, 1955

2,704,021

WHEELED IMPLEMENT FRAME

John F. Brundage, Oxnard, Calif., assignor to Allis-Chalmers Manufacturing Company, Milwaukee, Wis., a corporation of Delaware Application September 21, 1948, Serial No. 50,405

1 Claim. (Cl. 97—234)

This invention relates generally to vehicle propelled implements and is more particularly concerned with and has as an object the provision of a wheel supported tool mounting structure of the type adapted to be coupled with and drawn behind any suitable form of self-propelled vehicle, hereinafter referred to as a tractor, this structure including parts constructed and combined for coaction in an improved manner affording advantages as to ease of tread adjustment, as to the mounting, interchangeability and adjustment of tools, and/or as to general compactness, sturdiness and simplicity.

Another object of the present invention is to provide a wheel supported tool mounting frome structure incorporating improved features minimizing overall weight, the number and adjustability of parts, and/or the cost of manufacturing, assembling and servicing same.

The aforementioned and other objects and advantages will become readily apparent as the disclosure progresses and particularly points out those features considered of special importance in connection with the construction and operation of an illustrative embodiment of the invention. And accordingly this invention may be considered as comprising the constructions and combinations hereinafter more fully set forth in the following detailed description and appended claim, reference being had to the accompanying drawings, in which:

Fig. 1 is a side view of an illustrative embodiment of the invention showing one manner of mounting subsoilers thereon, parts being broken away to better show the construction involved;

Fig. 2 is a partial plan view of the structure shown in Fig. 1;

Fig. 3 is a partial view of the left portion of the structure taken on line III—III of Fig. 1 with parts broken away to better show the construction;

Fig. 4 is an enlarged sectional view taken along line IV—IV in Fig. 2;

Fig. 5 is a modification of the structure in Fig. 4 shown at a scale smaller than that used in Fig. 4;

Fig. 6 is a partial side view of the structure shown in Fig. 1 illustrating another method of mounting subsoilers thereon;

Fig. 7 is a partial plan view of the structure illustrating one manner in which a double row of disk bedders may be mounted thereon;

Fig. 8 is a partial view taken on line VIII—VIII in Fig. 7;

Fig. 9 is a view similar to Fig. 2 with the tools having entered the ground to a depth of maximum soil penetration;

Fig. 10 is an enlarged side view of strap members 51 and associated parts; and

Fig. 11 is an end view of the structure shown in Fig. 10.

Referring to Figs. 1 and 2 it may be seen that an apparatus illustrating the present invention comprises generally a wheel supported frame structure 1 adapted to be supportedly coupled with and drawn behind any self-propelled vehicle, such as a tractor (not shown), and having an elongated bar 2 detachably mounted on a rear portion thereof for selectively positioning tools therealong. More specifically frame structure 1 includes an elongated central member 3 having a pair of similar transverse tubular members 4 and 5 fixed to opposite sides of an intermediate portion of member 3, as by welding, in oppositely extending, aligned relation with respect to each other, a pair of laterally spaced generally parallel similar side members 6 and 7 extending rearwardly from the free ends of transverse members 4 and 5, respectively, and fixedly connected thereto through elbows 8.

The union between central member 3 and transverse members 4 and 5 is further braced by means of triangular shaped plate members 9 fixed, as by welding, in edge abutting relation to adjacent side portions of frame members 4 and 5 and the forward portion 10 of central frame member 3 (that is the portion in front of members 4 and 5). And frame portion 10 carries a coupling means comprising a pair of vertical plate members 11 positioned on either side of member 10 with the rearwardly disposed adjacent end portions thereof connected by a pin 12 carried by member 10 in a manner affording vertical swinging movement of the plates about a transverse axis. Between the forward end portions of plate members 11 there is positioned a swivel connector 13 including a forwardly projecting part 14 having a bolt receiving opening (not shown) through which a bolt 16 is placed to secure a clevis 17 thereto. And referring more particularly to Fig. 1, it will be seen that vertical plate members 11 have arcuately spaced aligned openings 18 therethrough which are adapted for alignment with a transverse bore 19 through the adjacent end portion of frame member 8 through which bolt 20, or the like, may be placed to selectively fix connector 13 in any of eseveral vertical positions relative to frame member 10. Thus it is obvious that the above described coupling means affords a universal connection between the tool carrying frame and the vehicle pulling same, it being understood that when thus connected the forward portion of the tool frame is in fact supported on the tractor drawbar or the like to which the coupling means is attached.

For additionally supporting the tool carrying frame 1 there is provided a pair of wheels 21 and 22 which are rotatably mounted on stub axles 23 (Fig. 3) carried by supporting arms 24 and 25 fixed to the frame structure in depending relation thereto. Wheels 21 and 22 include a disk portion 26 having circumferentially spaced holes (not shown) near its center adapted for alignment with similar holes (also not shown) on a hub 27 carried by stub axle 23 and bolts 28 are placed through the aligned pairs of openings to secure disk portion 26 in coaxial relation to axle 23. Referring also to Fig. 2, it will be noted that the wheel supporting structure includes a first rotary cross member 29 of an axial length substantially equal to the transverse width of the wheel space between the elongated central frame member 3 and the side frame member 6, and a second rotary cross member 30 which is a duplicate of the cross member 29 and which has an axial length substantially equal to the transverse width of the wheel space between the elongated central frame member 6 and the other side frame member 7. The cross members 29 and 30 are rotatably mounted between side member 6 and central member 3 and side member 7 and central member 3, respectively, in longitudinal alignment with respect to each other and in rearwardly spaced parallel relation to frame members 4 and 5. More specifically, a cylindrically shaped plug 31 is fixed within each end portion of hollow members 29 and 30 with a reduced end portion 32 thereof projecting from said hollow members into a cylindrical bearing support 33 fixed to the adjacent longitudinal frame member. A cylindrical bushing 34 is placed between the reduced portion of plug 31 and the internal wall of the bearing support 33 to afford rotation of tubular members 29 and 30 about a transverse axis.

Considering the space between the elongated central frame member 3 and the side frame member 6 as a first wheel space of predetermined width and length, and the space between the elongated frame member 3 and the side frame member 7 as a second wheel space of predetermined length and width, it will be noted that the plugs 31 and associated bearing parts at the axially opposite ends of the rotary cross members 29 and 30 afford means operatively mounting said cross members in spanning relations to said first and second wheel spaces at the forward ends, respectively, of the latter and in axially nonshiftable, transversely extending relation to the central frame member 3 and side frame members 6 and 7.

In order to secure the wheel supporting arms 24 and 25 to transverse members 29 and 30, respectively, there is fixed to the upper end of each arm a cylindrically shaped clamping means 35 and 36 having a longitudinal slot therein presenting flanged portions 37 and 38 for clamping arms 24 and 25, respectively, to rotatable members 29 and 30 in axial fixed relation thereto by suitable means such as longitudinal ribs 39 and 40 on members 29 and 30. Bolts 45 are used to secure the clamping means to rib portions 30 and 40. In this connection it will be noted that ribs 39 and 40 are made considerably longer than the clamping means so as to afford lateral adjustment of the wheel supporting arms along members 29 and 30.

A rock arm for rotating members 29 and 30, comprises arms 41 and 50 which are fixed to the inner portions of these members (Figs. 1, 2 and 3), these arms having upper portions thereof operatively connected to a suitable actuating means such as hydraulic ram 42. More particularly, a hydraulic ram (in this instance a double-acting type ram) is mounted on a bracket 43 carried by forwardly extending frame member 10 and has connection through a pair of hose 44, attached to either end of the ram, with a source of pressure fluid on the vehicle (not shown) to which the tool carrying frame 1 is coupled. The ram 42 includes a cylinder 46 having a pressure responsive piston 47 therein and a rod 48 fixed to piston 47 and extending rearwardly through an opening (not shown) in cylinder 46. The rear portion of rod 48 is disposed between adjacent actuating arms 41 and 50 on the wheel supporting structure and connected therewith by means of a pin 49 passing through aligned openings in the upper portions of the two arms 41 and 50. Thus it is obvious that pressure induced movement of piston 47 in cylinder 46 effects a movement of rod 48 and arms 41 and 50 connected therewith to thereby rotate members 29, 30, 24 and 25 and cause a vertical movement of the frame supporting wheels 21 and 22. This vertical movement of the wheels effects a raising or lowering of the frame structure 1 relative to the ground. And in this connection, it should be noted that the extending stroke of hydraulic ram piston 47 lowers wheels 21 and 22 relative to frame 1 thus utilizing the greatest available force in raising tools out of the ground. Also, this construction affords the maximum support for rod 48 when the tools are in ground engaging position since rod 48 will then have moved into cylinder 46. It will also be noted (see Figs. 1, 2, 10 and 11) that central frame member 3 has a pair of similar strap members 51 fixed thereto for pivotal movement about a transverse axis afforded by pin 52 and include hook shaped upper end portions 53. And it will be further noted that the upper end portions of arms 41 and 50 are interconnected by a sleeve part 54 having a bolt 56 therethrough and that the hooked end 53 of strap members 51 is adapted for engagement with sleeve 54 to thereby fix arms 41 and 50 in position. More particularly, strap members 51 have transversely aligned slotted openings 57 through the lower portion thereof for receiving pin 52 which construction permits straps 51 to be moved upwardly relative to pin 52 in order that the hooked end portions 53 may engage sleeve 54. And strap members 51 are joined at an intermediate point by a bolt 58 which carries a relatively large plate washer 59 at one end thereof. When connecting straps 51 with arms 41 and 50 bolt 58 is removed and hooked portion 53 of strap 51 is placed over sleeve 54. The bolt 58 and washer 59 are then replaced and it will be noted from Figs. 10 and 11 that washer 59 is positioned to prevent separation of sleeve 54 from the upper ends of strap 51, that is, with the plate washer in place the opening afforded at the hooked end portion 53 of strap members 51 is smaller than the outside diameter of sleeve part 54 carried by arms 41 and 50. This engaged position of straps 41 and arms 41 and 50 is possible only when wheels 21 and 22 are fully lowered with respect to frame 1 whereupon the frame is raised to the travelling position shown in Fig. 1.

Looking at Figs. 1, 2 and 4, it will be noted that the longitudinal frame members 3, 6 and 7 terminate at their free ends in laterally aligned sections of somewhat reduced diameter adapted for receiving transverse tool bar 2 thereon, which bar is shown as a tubular member of rectangular cross section. Each of these tool bar receiving sections comprises a cylindrical plug element 61 having one end portion 62 thereof fixed in the open end of the longitudinal frame member and the other end portion 63 of reduced diameter projecting rearwardly therefrom. And the tool bar 2 is provided with a plurality of pairs of transversely aligned openings (not shown) through the width of the bar into which are placed sleeve-like parts 64 presenting an opening on one end conforming in size with the diameter of the projecting plug portion 63 carried by the frame members and the other end of sleeve 64 is partially covered, having only a bolt receiving opening (not shown) therein. In securing the tool bar to the frame structure, sleeve-like parts 64 of tool bar 2 are positioned on end portions 63 of frame members 3, 6 and 7 and cap screws 66 are fitted into the bolt receiving openings for engagement with an internally threaded bore 67 formed in the end of each plug projecting portion 63. Referring particularly to Fig. 2, it will be seen that the rear portion of the frame structure also includes a transverse brace member 68 which is fixedly mounted on the ends of the longitudinal frame members 3, 6 and 7 in abutting relation to the ends thereof and to the shoulder formed by the reduced portion 63 of plug element 61. This brace member 68 is thus positioned immediately forward of tool bar 2 and carries set screws 69, one on either side of central member 3, which are positioned for engagement with the leading edge of tool bar 2. After the cap screws 66 which fix the tool bar to the ends of the longitudinal frame members are removed, the tool bar may be readily separated from the frame structure by turning set screws 69 to force a rearward movement of the tool bar 2 relative to frame 1. This feature of construction is quite advantageous particularly when heavy tools and tool bar are being used. Web plates 71 are fixed, as by welding, between central member 3 and brace member 68 to serve as a stiffener for the latter.

A modified construction of the tool bar receiving portion (Fig. 4) of the tool carrying frame structure 1 may be seen in Fig. 5 wherein the rearwardly projecting portion of plug 61 is tapered to present a smaller threaded end portion 72 adapted to receive a nut 73. This nut is rotatably mounted in an opening (not shown) in the rearwardly disposed edge 74 of tool bar 2 and is fixed against axial displacement relative thereto by means of a flanged outer portion 76 and a shoulder spacer 77 positioned on the inner side of edge 74 and held in place on nut 73 by a snap ring 78 or the like. And when nut 73 is turned for removal from the threaded plug portion 72 spacer 77 bears against the inner surface of tool bar edge 74 forcing a separation of tool bar 2 from frame structure 1. Likewise, when nut 73 is turned in the opposite direction flange 76 thereof bears against edge 74 urging the tool bar onto frame structure 1. This construction is advantageous in that it affords a simple and effective means for removing the tool bar and also eliminates the use of separable parts, such as nuts and bolts, which may be lost once the bar is taken off the frame structure.

The above described manner of securing the tool bar on the frame structure provides a tool mounting space the length of bar 2 and tools may be positioned therealong with any desired spacing between them, such as is shown in Fig. 2 wherein subsoilers 81 are mounted on the tool bar. In this illustrative arrangement, the subsoiler standards 82 shown have angle members fixed to the upper portion thereof so as to present a horizontal flange 83 disposed in abutting relation to the under side of the tool bar. A pair of similar strap members 84 are positioned astride the top width of the tool bar and have bolt receiving openings 86 at either end thereof alignable with similar openings 87 in flange 83. Bolts 88 are then passed through each pair of vertically aligned openings 86 and 87 to secure subsoiler 81 to tool bar 2. Fig. 6 illustrates another way of mounting subsoilers, or similar tools, wherein a portion of one of the longitudinal frame members is used to give the tool a more stable support. In this modification the horizontal flange 89 on the upper portion of tool standard 82 is relatively long with the rear half being clamped to tool bar 2 by strap members 84 and bolts 88 in a manner similar to that just described. The front part of the flange has a pair of laterally spaced openings (not shown) which receive the ends of a U-bolt 91 fitted over frame member 3 and clamped in position by nuts 92.

And looking now at Fig. 9, it will be seen that the frame structure shown in Figs. 1 and 2 has been lowered to a position wherein tools 81 mounted thereon have reached their maximum depth of soil penetration. That is, fluid pressure has been introduced into ram cylinder 46 so as to cause piston 47 and rod 48 to move to the left to their fully retracted position thereby moving arms 41 and 50 counterclockwise from the frame raised position in which they are shown in Fig. 1 to the frame lowered position in which they are shown in Fig. 9. In other words, contraction of the ram 42 is effective to rotate tubular members 29 and 30 and wheel supporting arms 24 and 25 in the same direction swinging wheels 21 and 22 vertically in a counterclockwise direction lowering frame 1 and tools 81 mounted thereon. In this connection, it will be noted that the parts just described are so constructed that when the tools are moved to the working position affording maximum penetration (shown in Fig. 9) the horizontal distance D between point B of the ground working tool and the point of contact A for the ground engaging wheels is relatively small. Wheels 21 and 22 function as depth gauge wheels and by moving tools 81 close in to the wheels for soil operations the effect of the vertical movement of the tractor drawbar (not shown) on the working depth of the tools is reduced to a minimum and uniform soil penetration is achieved.

Fig. 7 illustrates the use of the above described frame structure in combination with a bedding disk gang attachment 96. For securing the gang to tool bar 2 on frame structure 1 there is provided an attaching bracket comprising a pair of laterally spaced strap members 97 positioned beneath tool bar 2 having bolt receiving openings 98 at either end thereof, and a pair of laterally spaced angle members 99 positioned astride tool bar 2 with the horizontal flanges 101 of each angle disposed in vertically spaced parallel relation with respect to strap members 97 and including bolt receiving openings (not shown) adapted for alignment with openings 98 whereby bolts 102, or the like, may be placed through the aligned openings to secure strap members 97 and angle members 99 to the tool bar. The vertical flanges 103 of the two angle members 99 extend upward from the tool bar in spaced parallel relation to each other and a relatively short tubular member 104 is fixed therebetween with a vertically disposed plate member 106 fixed to the end thereof in rearwardly spaced parallel relation to tool bar 2. This plate member 106 has a pair of vertically spaced bolt receiving openings therein (not shown) through which bolts 107 are positioned for securing thereto a bracket 108 fixed to the front disk gang 109. Looking at Fig. 8, it will be noted that the vertical flange 111 of bracket 108 has a pair of vertically spaced arcuately shaped openings 112 therein for receiving bolts 107 in a manner affording angular adjustment of the bracket relative to plate member 106. The horizontal flange 114 of this bracket (Fig. 7) is also provided with arcuately shaped bolt receiving openings 116 and is pivotally secured by bolt 117 to transverse bar 118 carried by the forward gang of disks. And to fix front disk gang 109 in any selected angular position with respect to bracket 108 there is provided a U-bolt 119 (Fig. 8) which is positioned beneath front disk gang bar 118 with the threaded end portions thereof extending upward through openings 116 and secured in position by nuts 122. It is obvious, therefore, that the forward disk gang may be selectively angularly positioned, both vertically and horizontally, with respect to tool carrying frame structure 1.

To secure a second disk gang in tandem with that just described a tubular member 123 (Fig. 7) is fixed, as by welding or any other suitable manner, to a central portion of the vertical flange 111 on forward attaching bracket 108. Tubular member 123 extends rearwardly and has fixed to its rear end portion a vertical plate member 124 having a pair of vertically spaced aligned bolt receiving openings therein (not shown) affording means for connecting thereto an attaching bracket 126, similar to bracket 108, to which rear gang 127 may be secured in any selected angular position. And it will be obvious from the foregoing description that one or more additional gangs may be similarly fixed to tool bar 2 in laterally spaced relation to gangs 109 and 127.

From the foregoing description it is apparent that a tool carrying frame structure embodying features of the present invention is adapted for use with a wide variety of earth working tools which may be readily interchanged and adjustably positioned on the frame. Moreover, there is provided an improved means for readily and easily changing the tread width of the frame supporting wheels and, also, means for adjusting the height of the frame relative to the ground, the latter adjustment being controlled from the operator's position on the vehicle drawing the tool carrier.

And although the invention is illustrated as applied to a two wheel frame structure having a pair of side members and a central member, it is to be understood that certain of the objects can be accomplished irrespective of the number of central members and supporting wheels used, and that it is not intended to limit the invention to the exact constructions and combinations shown and described as certain features thereof are of more general application and as various modifications within the scope of the appended claim may occur to persons skilled in the art.

It is claimed and desired to secure by Letters Patent:

A mobile implement frame comprising, in combination, a rigid frame including front and rear elongated transverse frame members, an elongated central frame member fixed to the midportion of said front transverse frame member and extending rearwardly therefrom, a pair of elongated side frame members fixed to the ends of said front transverse member and extending rearwardly therefrom, said central and side frame members being disposed parallel to each other and connected to said rear transverse frame member so as to provide a first wheel space of predetermined width and length between said central frame member and one of said side frame members and a second wheel space between said central frame member and the other of said side frame members, the longitudinal axes of the several frame members being contained in a generally horizontal plane; a first rotary cross member of an axial length substantially equal to the transverse width of said first wheel space, a second rotary cross member of an axial length substantially equal to the transverse width of said second wheel space, means operatively mounting said cross members for rotation in transverse spanning relation to said first and second wheel spaces, respectively, closely adjacent said front transverse frame member and in axially nonshiftable relation to said central and side frame members with the axes of said cross members being transversely aligned and contained in said plane; a pair of wheel supporting arms connected, respectively, in nonrotatable axially shiftable relation with said cross members; releasable locking means associated with said arms securing the latter in selected positions of axial adjustment relative to said cross members; a pair of ground wheels rotatably mounted, respectively, on said arms at the free ends thereof; a pair of actuating arms nonrotatably secured in radially extending relation, respectively, to said cross members; and actuating means operatively connected to said actuating arms for simultaneously swinging said actuating arms to rotate said cross members and move said wheels relative to said frame to dispose the frame in raised and lowered positions; the overall length of each of said wheel supporting arms and associated wheels being such as to dispose the rear edges of said wheels forward of and closely adjacent said rear transverse frame member when the frame is in lowered position.

References Cited in the file of this patent

UNITED STATES PATENTS

| | | |
|---|---|---|
| 186,407 | Baker | Jan. 23, 1877 |
| 215,931 | Jones | May 27, 1879 |
| 400,977 | Ventzki | Apr. 9, 1889 |
| 490,210 | Millan et al. | Jan. 17, 1893 |
| 645,977 | Shields | Mar. 27, 1900 |
| 677,495 | Bilz | July 2, 1901 |
| 928,736 | Brenneis | July 20, 1909 |
| 1,099,337 | Buchanan | June 9, 1914 |
| 1,231,225 | Wheeler | June 26, 1917 |
| 1,354,665 | Knuppel | Oct. 5, 1920 |
| 1,376,787 | Strandlund | May 3, 1921 |
| 1,477,324 | Dennis | Dec. 11, 1923 |
| 1,603,019 | Boda | Oct. 12, 1926 |

(Other references on following page)

UNITED STATES PATENTS

| | | | |
|---|---|---|---|
| 1,683,018 | Boda | Sept. 4, | 1928 |
| 1,683,019 | Boda | Sept. 4, | 1928 |
| 1,740,841 | Smith | Dec. 24, | 1929 |
| 1,809,500 | Willig | June 9, | 1931 |
| 1,811,275 | McMillan | June 23, | 1931 |
| 1,861,626 | Flatley | June 7, | 1932 |
| 1,930,893 | Cotharp | Oct. 17, | 1933 |
| 1,963,426 | Taylor | June 19, | 1934 |
| 1,969,684 | Bird | Aug. 7, | 1934 |
| 2,005,205 | Rix | June 18, | 1935 |
| 2,029,250 | Noell et al. | Jan. 28, | 1936 |
| 2,100,856 | Killefer | Nov. 30, | 1937 |
| 2,195,631 | Post et al. | Apr. 2, | 1940 |
| 2,286,359 | Gemberling | June 16, | 1942 |
| 2,340,497 | Thomas | Feb. 1, | 1944 |
| 2,464,615 | Sawall | Mar. 15, | 1949 |
| 2,581,533 | Hipple | Jan. 8, | 1952 |

FOREIGN PATENTS

| | | | |
|---|---|---|---|
| 121,613 | Australia | June 20, | 1946 |
| 182,521 | Great Britain | June 23, | 1922 |
| 184,550 | Great Britain | Aug. 8, | 1922 |
| 259,654 | Great Britain | Oct. 11, | 1926 |